United States Patent [19]

Tokutomi

[11] 4,244,643
[45] Jan. 13, 1981

[54] MANUAL SETTING DEVICE IN DIGITAL TYPE ELECTRICAL CONTROL CAMERA

[75] Inventor: Seijiro Tokutomi, Tokyo, Japan

[73] Assignee: Asahi Kogaku Kogyo Kabushiki Kaisha, Tokyo, Japan

[21] Appl. No.: 1,090

[22] Filed: Jan. 5, 1979

Related U.S. Application Data

[63] Continuation-in-part of Ser. No. 839,465, Oct. 4, 1977, abandoned.

[30] Foreign Application Priority Data

Oct. 5, 1976 [JP] Japan ................. 51/119556

[51] Int. Cl.$^3$ ............. G03B 7/093; G03B 17/20
[52] U.S. Cl. ................... 354/23 D; 354/289
[58] Field of Search .......... 354/23 D, 289, 53, 54, 354/55, 56, 57

[56] References Cited

U.S. PATENT DOCUMENTS

| | | | |
|---|---|---|---|
| 4,021,828 | 5/1977 | Iura et al. | 354/289 |
| 4,079,386 | 3/1978 | Murakami et al. | 354/289 |
| 4,079,387 | 3/1978 | Kawamura | 354/289 |
| 4,081,813 | 3/1978 | Kawamura | 354/289 |

OTHER PUBLICATIONS

The TTL Data Book, 2nd Edition, Texas Instruments, Inc., 1976, pp. 7–143.

Primary Examiner—L. T. Hix
Assistant Examiner—S. D. Schreyer
Attorney, Agent, or Firm—Sughrue, Rothwell, Mion, Zinn and Macpeak

[57] ABSTRACT

A manual setting device is provided in a camera wherein the shutter speed is electrically controlled. The manual setting device can be used as an alternate control in an automatic exposure control camera or may be used in a non-automatic electrically controlled camera. For a camera having an electrically controlled shutter speed, first and second counters are provided. The first counter is preset to a computed or desired shutter speed, and the output of the first counter corresponding to the shutter speed is displayed by LEDs in the viewfinder of the camera. The second counter operates in response to an oscillator, and when the count accumulated in the second counter equals that of the first counter, the shutter bottom curtain electromagnet is operated. The manual setting device is a pulse generator controlled by a switch to preset the counter.

9 Claims, 3 Drawing Figures

MANUAL SETTING DEVICE IN DIGITAL TYPE ELECTRICAL CONTROL CAMERA

CROSS-REFERENCE

This application is a continuation-in-part of Ser. No. 839,465 filed on Oct. 4, 1977, abandoned.

BACKGROUND OF THE INVENTION

This invention generally relates to electrically controlled cameras, and more particuarly to a manual setting device for such cameras which permits easy and rapid setting of a shutter speed value while viewing an object to be photographed through the camera viewfinder.

Recently, a number of cameras have been developed wherein the shutter speed is electrically controlled automatically in response to a metered brightness value $B_V$ and preset film sensitivity value $S_V$ according to the APEX equation. In the shutter preferred system ES, the shutter value $T_V$ is preset and the aperture value $A_V$ is computed. Either type of system is typically provided with a manual operation made. In the manual operation of these electrically controlled cameras, a switching knob or ring is turned to cause the index to coincide with the desired shutter speed value $T_V$. Thus, in the manual mode of operation, these electrically controlled cameras are similar in operation to conventional mechanically controlled cameras. Even though the shutter speed value is displayed in the camera's viewfinder, it is nevertheless difficult to turn the knob or ring while viewing the object to be photographed through the camera viewfinder.

SUMMARY OF THE INVENTION

Accordingly, it is an object of the invention to provide a manual setting device which facilitates the easy manual setting of the shutter speed value $T_V$ in an electrically controlled camera while viewing the object to be photographed through the camera's viewfinder.

The invention is especially suitable for digital type electrically controlled cameras and can be used as an alternate control in an automatic exposure camera or may be used in a non-automatic electrically controlled camera. For a camera having electrically controlled shutter speed, first and second counters are provided. The first counter is preset to a computed or desired shutter speed, and the output of the first counter corresponding to the shutter speed is displayed by display means, such as for example light emitting diodes (LEDs), in the viewfinder of the camera. The second counter operates in response to an oscillator, and when the count accumulated in the second counter equals that of the first counter, the shutter bottom curtain electromagnet is operated. The manual setting device according to the invention is a pulse generator controlled by a switch to preset the counter.

BRIEF DESCRIPTION OF THE DRAWINGS

This invention will be described with reference to an embodiment shown in the accompanying drawings. In the accompanying drawings:

FIG. 3 is a top view showing the external apparance of an ES camera employing the digital control ES circuit shown in FIG. 1.

DETAILED DESCRIPTION OF THE INVENTION

Figure 1:
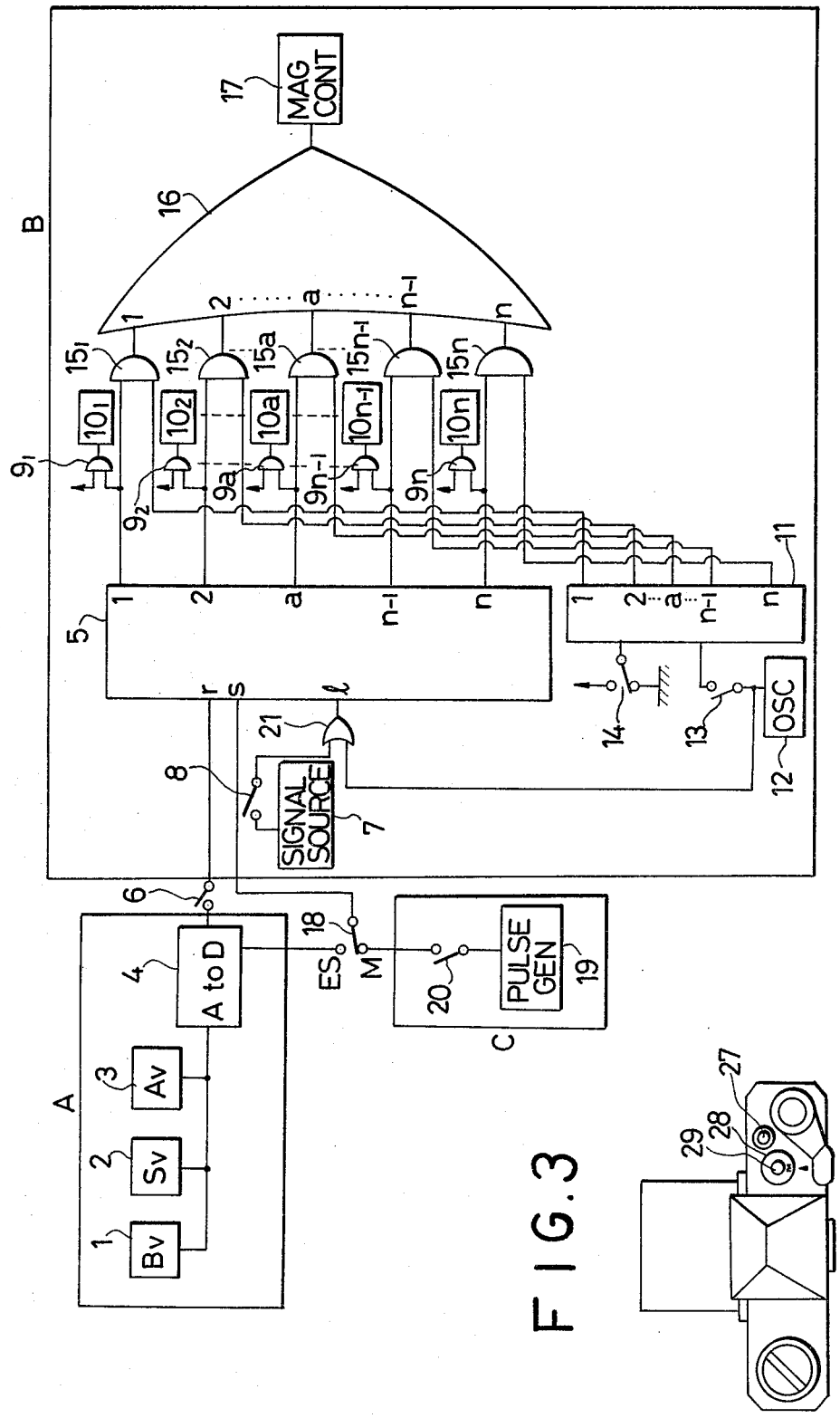
FIG. 1 is a block diagram showing one example of a digital control ES circuit according to this invention.

In FIG. 1, reference character A designates a $T_V$ signal generating section, which comprises circuits 1, 2 and 3 for generating signals representing respectively object brightness $B_V$, film sensitivity $S_V$, and an aperture value $A_V$. The $T_V$ signal generating section A computes the shutter speed value according to the APEX equation $T_V = B_V + S_V - A_V$. To this end, each of the signal generating circuits 1, 2, and 3 provide photographing information which is subjected to logarithmic compression. The resulting $T_V$ signal is then subjected to analog-to-digital conversion by the use of a conventional circuit thereby obtaining a serial digital pulse train proportional to the computed shutter speed. The computation of the $T_V$ signal and the analog-to-digital conversion of that signal is performed by circuit 4 in a manner well known in the art. Circuit 4 operates to produce periodic reset signals which are in synchronization with the train of pulse signals the number of which corresponds to the computed $T_V$ information in n steps (n = 1, 2, ... n). An example of a $T_V$ signal generating circuit suitable for use in section A is disclosed in Japanese patent application Ser. No. 48-137917 laid open July 14, 1975, under Japanese Patent Application Disclosure No. 50-87645.

Reference character B designates a shutter control and display section. Counter 5 having n output terminals counts the pulses generated by circuit 4 with the result that one of the output terminals of the counter is set at logic "one" level. In this counter, reference characters r, s and l are intended to designate a reset signal input terminal, a pulse signal input terminal, and a latch signal input terminal, respectively.

A switch 6 controls the application of the reset signal from A to D circuit 4 to the terminal r of counter 5. A signal source 7 or a clock oscillator 12 operates to latch the contents of counter 5 through an OR gate 21 immediately before the shutter is operated. In a conventional circuit, when the shutter is released, the latching operation of counter 5 continues until the next shutter release operation. For this reason, the $T_V$ information does not change, and therefore it would be preferable if a latching operation releasing signal is supplied. In the present invention, in the case where the shutter is not actuated, the pulse train of the oscillator 12 appears on the terminal l and the content of counter 5 is sampled and outputted in accordance with the frequency of the pulse train thereof. On the other hand, in the case where the shutter is actuated, a latch switch 8 is closed to thereby continue latching the content of the counter 5.

Two-input AND gates $9_1$ through $9_n$ control the shutter speed display in the camera viewfinder. More specifically one of the two inputs of each AND gate is connected to an output of the counter 5 while the other inputs of the AND gates have a voltage level corresponding to a logic "one" applied. Display lamps, such as light emitting diodes (LEDs), $10_1$ through $10_n$ are connected to the outputs of AND gates $9_1$ through $9_n$, respectively, and are, in general, visible in the camera viewfinder. A shutter time controlling binary counter 11 receives pulses from the clock oscillator 12 through a time shutting switch 13. The counter 11 is reset by means of a reset switch 14.

Counter 11 can be implemented by using Texas Instruments SN 74193 4-bit binary counters connected in series to provide the desired count capacity and a binary to decimal decoder. Time setting two-input AND gates $15_1$ through $15_n$ each have one input terminal connected to an output of counter 5 and the other input terminal connected to a corresponding output terminal of counter 11. An n-input OR gate 16 receives as inputs the outputs of the AND gates $15_1$ through $15_n$, and the output of OR gate 16 is connected to a bottom curtain electromagnet control section 17.

Connected between sections A and B is an ES manual change-over switch 18. Sections A and B form a digital control ES circuit by tripping the armature of the switch 18 to the ES side. The circuits indicated by sections A and B can be formed by the use of well-known circuits, and therefore further detailed description of them will be omitted; however, the operations thereof will be briefly described.

During the operation of the ES circuit, the counter 5 is repeatedly set with the computed $T_V$ information and reset by circuit 4. The ath ($1 \leq a \leq n$) output of counter 5 corresponding to the counter obtained for the computed value $T_V$ is raised to the logic "one" level, and the output of the AND gate $9a$ is raised to the logic "one" level whereby the display lamp $10a$ is turned on to display the value $T_V$. Then, when the shutter is charged, the switch 13 is in its "off" state, and the switch 14 is momentarily operated to reset the counter 11, as a result of which all of the outputs thereof are lowered to the logic "zero" level. At this time, the bottom curtain of the shutter is held by the operation of the electromagnet. Thereafter, when the shutter is released, the latch signal switch 8 is operated to latch the contents of the counter 5 while the switch 6 is turned off, thereby preventing the counter 5 from being reset. Thus, the computed value $T_V$ is set in the counter 5, and the corresponding output, for instance the ath output, is raised to the logic "one" level. Then, after the lens is stopped down, the top curtain starts moving, and simultaneously the switch 13 is turned on, as a result of which the counter 11 starts counting the clock pulses produced by the oscillator 12. Thus, when the ath output of the counter 11 is brought to a logic "one" level, the output of the AND gate $15a$ is raised to the logic "one" level, and the output of the OR gate 16 is also raised to the logic "one" level, whereby a signal is applied to the bottom curtain electromagnet control 17 to close the bottom curtain. Thus, the exposure has been completed.

A manual $T_V$ setting section according to this invention is designated by section C which comprises a manual setting pulse generator 19, having a frequency of about 0.5 to 5.0 Hz, and a manual $T_V$ setting switch 20 for switching on and off the output of the pulse generator 19. In operation, the armature of the switch 18 is tripped over to the manual side, while the switch 6 is turned off. The content of the counter 5 controls the output of one of the AND gates $9_1$ through $9_n$ corresponding to the output terminal position where the logic "one" level is outputted so that the value $T_V$ is displayed as before. Similarly, one of the inputs of the AND gates $15_1$ through $15_n$ corresponding to the output position of the counter 5 is raised to the logic "one" level, and the shutter control time is set in correspondence to the displayed value $T_V$. Since the value $T_V$ is changed by one step for every input pulse to the counter 5 when the pulses from the pulse generator 19 are caused to be applied to the counter 5 by closing the switch 20, when displayed $T_V$ reaches a desired $T_V$, the application of the pulses is suspended by opening the switch 20. Thus, the shutter speed can be set to the desired value $T_V$ while viewing the object to be photographed through the camera viewfinder. The application of pulses to the counter 5 may be controlled by the on-off operation of the oscillation pulses. If a push-button type switch is employed as the switch 20, the $T_V$ setting value is changed continuously step by step in response to the pulse application by depressing the push-button type switch, and upon release of the depression of the switch, the switch is opened and the shutter speed is set to the value $T_V$ displayed when the switch is opened. The rate of continuously changing the $T_V$ setting value can be varied by the rate of depressing and releasing the switch 20.

Figure 2:
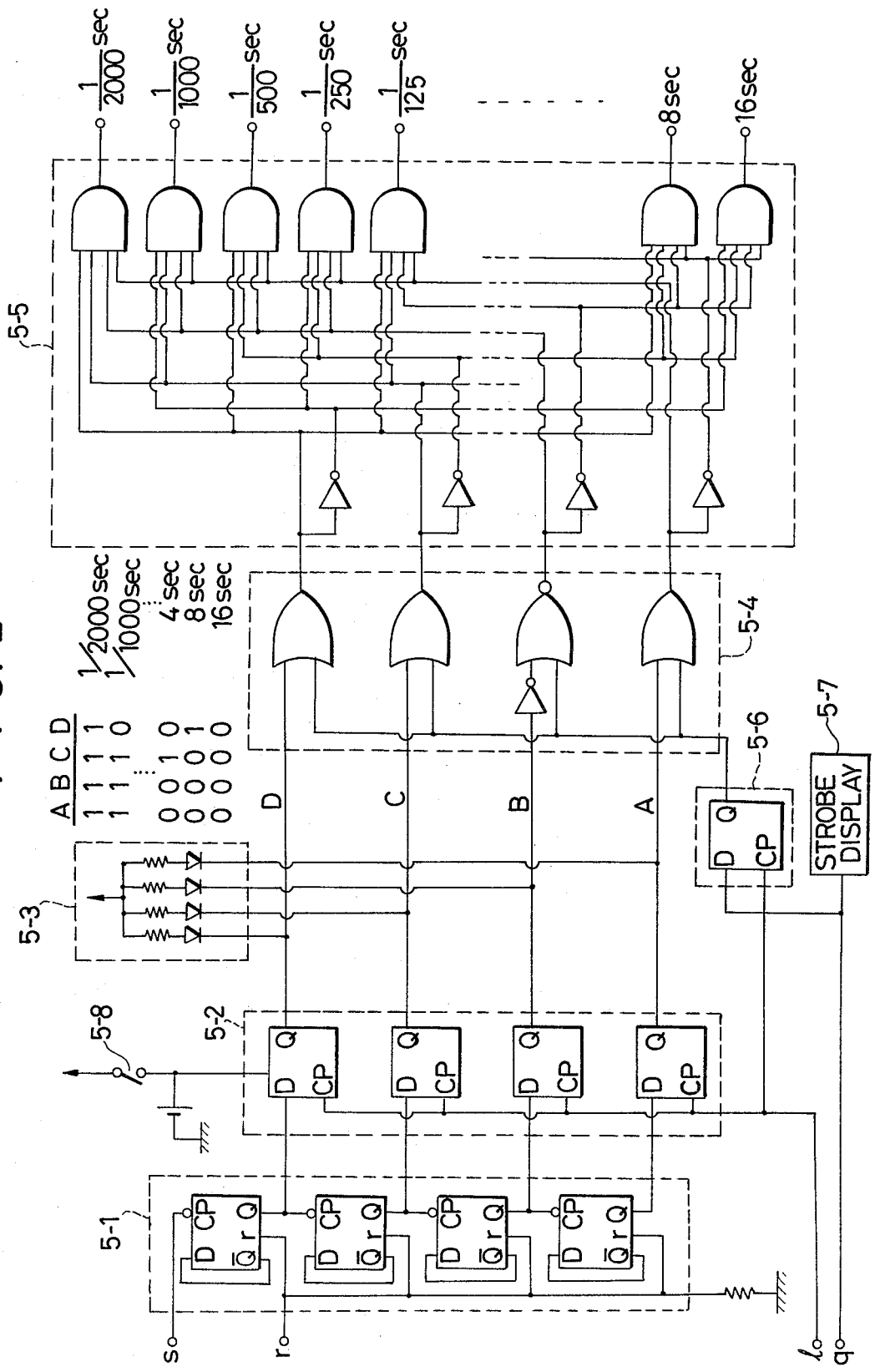
FIG. 2 is also a block diagram showing the first counter according to the invention.

Referring now to FIG. 2, the counter 5 will be described in greater detail. For the purpose of explanation, the following disclosure is made under the assumption that the shutter speed is selected from sixteen-stage predetermined values.

A pulse number counting circuit 5-1 counts the number of pulse signals corresponding to the $T_V$ information applied to the pulse signal input terminal s from the preceding analog-to-digital circuit 4 through the ES manual change-over switch 18. The pulse number counting circuit 5-1 comprises four D-type flip-flops, and which provides four-bit sixteen-stage binary output signals corresponding to sixteen-stage shutter speeds, i.e., 1/2000, 1/1000, 1/500, 1/125, 1/60, 1/30, 1/15, 1/8, 1/4, 1/2, 1, 2, 4, 8 and 16 seconds. The binary indication (1, 1, 1, 1) corresponds to 1/2000 second of the shutter speed, and (1, 1, 1, 0) to 1/1000 second, and so on, and the binary indication (0, 0, 0, 0) corresponds to 16 seconds of the shutter speed.

A latch circuit 5-2 comprising four latch-type flip-flops operates to latch the content of the pulse number counting circuit 5-1 upon receipt of the latch signal at the terminal from the output of an OR gate 21. A pull-up circuit comprises four diodes and operates to pull-up the output of the latch circuit 5-2. More specifically, when a main switch 5-8 is in the "off" state, the pull-up circuit 5-3 operates to prevent the output of the latch circuit 5-2 from being applied to gate circuit 5-4 of the next stage. The gate circuit 5-4 comprises three OR gates and a NOR gate, and provides an output in response to the output of a strobe (flash unit) information memory section 5-6 which comprises a latch-type flip-flop. When the output of the strobe information memory section 5-6 is applied to the gate circuit 5-4, the gate section 5-4 provides an output corresponding to a predetermined $T_V$ value. A decoder 5-5 comprising sixteen four-input AND gates receives an output of the gate circuit 5-4, and an output signal corresponding to one of the 16-stage $T_V$ information is given to one of 16 terminals.

The strobe information memory section 5-6 receives and stores a strobe charge completion signal from a strobe information input terminal q. Information of the strobe charging condition is brought into the gate circuit 5-4 through the strobe information memory section 5-6. A display section 5-7 for displaying a strobe charge completion is provided adjacent to the viewfinder.

The operation of the above-mentioned counter 5 will now be described. The main switch 5-8 is a power battery switch for the overall camera circuit, and only the latch circuit 5-2 is directly connected to the power battery. Therefore, the latch circuit 5-2 holds the content of the pulse number counting circuit 5-1 at the time when the power battery is in an "off" state. Specifically, the latch circuit 5-2 enables storage of a desired $T_V$ information value even after the power battery is in the "off" state. Unless this latch circuit is provided, the $T_V$ value established at the time when the power battery is turned "on" becomes delayed. The consumption of electrical current in the latch circuit can be neglegible if it is constructed with C-MOS.

Due to the gate circuit 5-4 and the strobe information memory section 5-6, when a strobe is used, the $T_V$ value is automatically set to a predetermined strobe synchronizing value by the strobe charge completion signal regardless of the $E_S$ or manual operation is selected. When the strobe charge completion signal is received in the information memory section 5-6 from the strobe information input terminal q, the output of the gate circuit 5-4 is set to be (1,0,1,1) in binary indication which corresponds to 1/125 second of the strobe synchronizing shutter speed. More specifically, since the gate coupled to line B is a NOR gate and other three gates in the gate circuit 5-4 are ORs, when a signal of high level is applied to one input terminal of each gate. The output of the gate circuit 5-4 is (L,),L,L) in binary indication. The strobe charge completion display is achieved by the display unit 5-7 which displays the ready condition of the strobe light emission. At the same time, this will inform the photographer that the $T_V$ value is not the content of the pulse counting circuit 5-1.

FIG. 3 is a top view showing the external appearance of a camera according to the embodiment shown in FIG. 1. In FIG. 3, reference numeral 27 designates a shutter button, reference numeral 28 an operating member of the ES and manual change-over switch 18, and reference numeral 29 a push-button member of the manual setting switch 20. As is apparent from the figure, the push button 29 is provided at the position of the shutter speed setting knob of a conventional camera. However, since the operation is achieved merely by depressing the button instead of turning the knob, the operation can be accomplished by a person holding the camera and observing the object through the view finder can, and be accomplished smoothly in the manner as the operation of the shutter button. In addition, since the button 29 is a simple switch, it may be located at any other suitable position.

The description of this invention has been made with reference to the automatic exposure camera. However, the invention can be effectively applied to manually-operated electrical control type cameras having no automatic exposure mechanism. Furthermore, the invention can be applied not only to the setting of shutter speed but also to the setting of the film sensitivity value $S_V$ and exposure multiples.

As is apparent from the above description, in the present invention, the specific features of the digital exposure control system are sufficiently utilized and the number of pulses is controlled by the use of the push button type switch, to thereby manually set the shutter speed. Therefore the invention exhibits the following improved characteristics:

(1) No setting variable resistor is necessary;
(2) The member in the setting mechanism is only a simple switch;
(3) The display device can be used commonly for both the automatic control and the manual control.

Thus, the invention can contribute to a reduction in cost, and to an improvement of reliability in a camera system. Especially, the improvement in operation is obtained by employing a one-touch system, or a push-button type switch, since the setting mechanism cannot be provided by the conventional system. Hence, the photographing operation can be accomplished more readily. Furthermore, since the conventional switching knob or ring can be eliminated, the degree of freedom in design is increased. Accordingly, cameras novel in function and external appearance can be provided according to this invention.

What is claimed is:

1. In a digital electrical control camera of the type wherein the shutter speed is electrically controlled by a circuit comprising a first counter preset to a suitable shutter speed, display means viewable through the camera viewfinder for displaying the shutter speed preset in said first counter, an oscillator, a second counter responsive to said oscillator when the shutter is released for counting up to a predetermined number, and gating means connected to the outputs of said first and second counters for generating an output when the count accumulated in said second counter is equal to the count preset in said first counter to stop the shutter timing, the improvement comprising manually operated pulse generating means connected to said first counter for presetting said first counter to said suitable shutter speed, and means for generating a latch signal when said shutter is actuated, said first counter comprising a pulse counting circuit for counting pulses indicative of shutter speed, a latch circuit to latch the contents of said pulse counting circuit in response to said latch signal, a gate circuit and a decoder for providing an output to said gating means.

2. The improvement recited in claim 1 wherein said pulse generating means comprises a pulse generator and a push button switch, said pulse generator providing a single pulse to said first counter for each manual actuation of said push button switch.

3. In the combination recited in claim 1 wherein said camera further includes a shutter speed value computing circuit responsive to a preset film sensitivity value, a preset lens aperture value and the brightness of an object to be photographed for generating a train of pulses in number equal to the computed shutter speed value, said improvement further comprising a switch for selectively connecting either the output of said shutter speed value computing circuit or said manually operated pulse generating means to said first counter.

4. The improvement of claim 1 further comprising means responsive to camera power condition to store shutter speed information in said latch circuit when the camera power is turned off.

5. The improvement of claim 1 further comprising means responsive to a strobe unit charge signal and delivering an output to said gate circuit, said gate circuit being responsive to said output to automatically provide a gate output signal in response to which said decoder provides an output to said gating means representing a predetermined strobe synchronizing shutter speed.

6. The improvement of claim 5 further comprising means responsive to camera power condition to store shutter speed information in said latch circuit when the camera power is turned off.

7. The improvement of claim 6 wherein said means responsive to camera power condition comprises an inhibitor circuit to prevent the output of said latch circuit from being applied to said gate circut.

8. The improvement of claim 1 wherein said means for generating a latch signal comprises a signal source, an OR gate coupling said oscillator and said signal source to said first counter, and switch means between said signal source and said OR gate to provide the output of said signal source to said OR gate when said shutter is actuated.

9. The improvement of claim 8 wherein said latch circuit latches the content of said pulse counting circuit upon receipt of an output signal from said OR gate.

* * * * *